Figure 1:
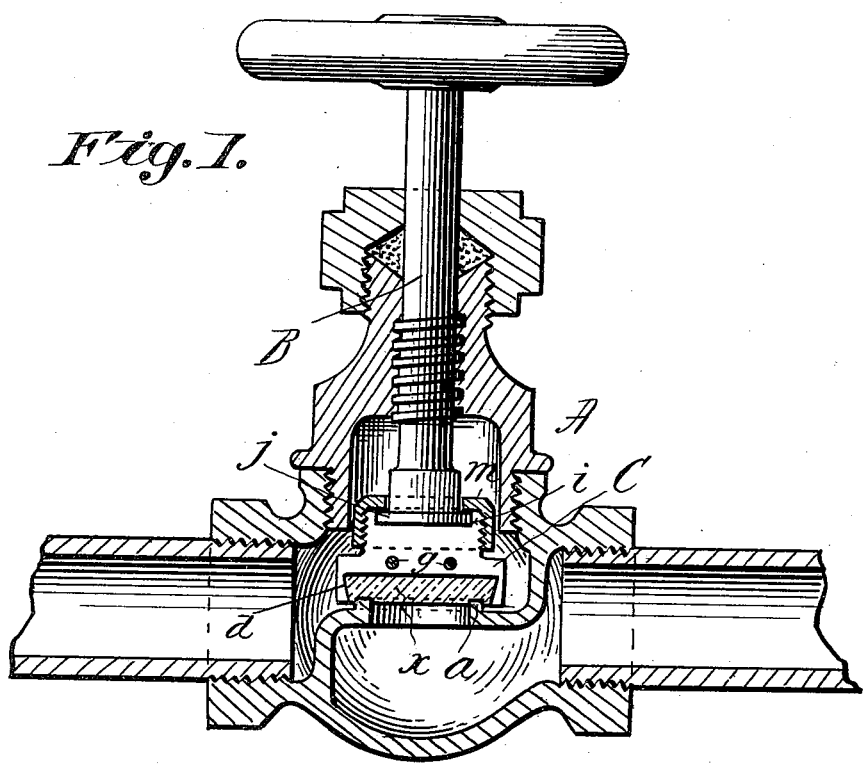

No. 663,607. Patented Dec. 11, 1900.
M. E. LYNCH.
DISK HOLDER FOR VALVES.
(Application filed Jan. 23, 1900.)
(No Model.)

Witnesses:
J. R. Garfield
M. A. Campbell

Inventor.
Michael E. Lynch
by Wm. F. Bellows,
Attorney.

UNITED STATES PATENT OFFICE.

MICHAEL E. LYNCH, OF ELIZABETH, NEW JERSEY.

DISK-HOLDER FOR VALVES.

SPECIFICATION forming part of Letters Patent No. 663,607, dated December 11, 1900.

Application filed January 23, 1900. Serial No. 2,503. (No model.)

*To all whom it may concern:*

Be it known that I, MICHAEL E. LYNCH, a citizen of the United States of America, and a resident of Elizabeth, in the county of Union and State of New Jersey, have invented certain new and useful Improvements in Disk-Holders for Valves, of which the following is a full, clear, and exact description.

This invention relates to improvements in valves, and more especially to the disk-holders for the same.

As well known, the valves extensively employed in steam-pipes, as well as in other situations, frequently require the renewal or replacement of the disks or packings.

In the commonest form of steam-valve the disk or packing carried at the lower end of the valve-stem and which seats upon the annular valve-seat is in the form of an annulus or washer and is held in place in the socketed lower end of the valve-stem by a clamping nut or sleeve which screws upon a central threaded stud or end extension of the valve-stem and has a shoulder which is brought to a binding or clamping seat around the inner marginal portion of the centrally-apertured packing-disk. In this most common description of valve there is but comparatively slight body or bulk of the packing material within the internal edge of the valve-seat, such scant overlapping beyond the said internal valve-seat edge being by reason of the presence within the middle of the packing-washer of the aforementioned threaded valve-stem extension or stud and the clamping-nut screwed thereupon. In this description of valve and valve-packing, which packing is usually composed of hard vulcanized rubber or vulcanized fiber, the packing becomes, all too soon, cracked with radial seams extending from its inner edge, resulting in an imperfect packing, which, if disregarded, will permit the steam that forces its way past the packing to lap out the valve-seat and ruin the valve. Furthermore, in the common form of steam-valve considerable difficulty is experienced in the removal of the old worn-out and ineffective packing from the annular trough-like socket in which it was fitted. It is often required that the same be dug out with metallic instruments or tools, causing a mutilation of the socketed disk-holder and the rendering of it imperfect and inefficient.

One object of this invention is to provide an improved disk-holder whereby a disk may be employed therein which is not apertured centrally, so that, therefore, it may have a considerable portion thereof located within the internal edge of the valve-seat, so that the disk or packing in seating and conforming to the valve-seat will have ample bulk thereof inside and against the internal wall of the valve-seat for a very effectual packing action.

Another object of the invention is to so construct the disk-holder that it comprises readily-separable clamping parts, whereby the disk or packing may be most readily placed therein or removed therefrom.

The invention consists in constructions and combinations of parts, all substantially as hereinafter fully described, and set forth in the claims.

Reference is to be had to the accompanying drawings, in which this invention is illustrated, and in which—

Figure 2:
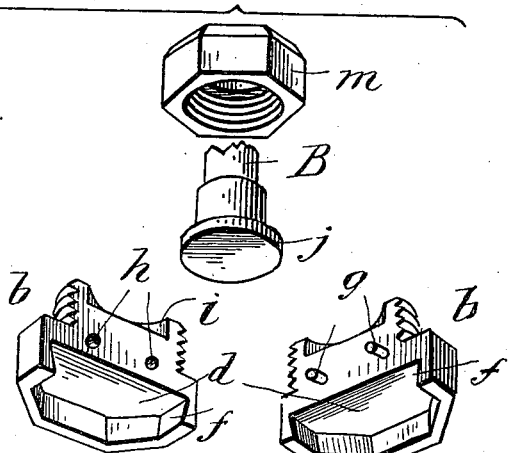

Figure 1 is a central vertical sectional view through a valve which is of ordinary construction, except as to the improved disk-holder which is therein provided. Fig. 2 is a perspective view of the lower end portion of the valve-stem and the parts constituting the separable disk-holder, the disk or packing being also shown, and the several parts being shown as separated one from another.

Similar letters of reference indicate corresponding parts in both views.

In the drawings, A represents the valve, of which $a$ is the annular valve-seat surrounding the circular opening on which the disk or packing $x$ of the valve seats, said valve being carried at the lower end of the valve-stem B, which works by screw-threading in the gland of the valve, as usual.

The disk-holder of the valve comprises the two separable parts or segments $b\ b$, separable on the axial plane of the holder and adapted to be matched together and retained in their matched relations by the studs or dowels $g\ g$, projecting from the plane face of the one part and fitting into the sockets $h\ h$, formed within the plane face of the other of said parts $b$.

The lower enlarged end portion of the two-part disk-holder is constructed with the socket $d$, the same as shown, being preferably of an octagonal form, although the socket may be circular or of other form. The disk or packing is in the form of a plinth, which is of corresponding form to the socket therefor in the two-part disk-holder. The internal wall of the socket, as shown at $f$, is undercut, and the packing is also preferably marginally of tapered or dovetailed form, whereby the packing will be the more effectually retained by the holder.

The upper or rear end of the two-part disk-holder is constructed with an externally-screw-threaded hub or boss, which also has the internal socket $i$, which opens upwardly and into which the flange enlargement $j$ at the lower end of the valve-stem is fitted.

$m$ represents the coupling-nut, which not only by screwing on the threads of the hub-like part of the disk-holder holds said two parts together for the retention of the packing-disk, but also couples the disk-holder to the valve-stem.

The edges of the packing-disk may be slightly beveled to correspond to the undercutting at $f$ of the wall of the socket in which the disk is held, or where soft packings are employed their edges may be straight and they may be made to assume the form of the disk-holder socket by the pressure of the notched parts of the holder. The undercutting is not in any event absolutely essential; but this formation is preferred for manifest reasons.

The lower part of the view Fig. 2 indicates the aspect of the bottom of the packing-disk after the same has been in use for a more or less protracted period, it showing an annular groove corresponding to the upstanding edge of the valve-seat $a$ with effectual packing capability not only at the top of the seat, but also at the internal and external walls adjoining the valve-seat top.

It is of course apparent from the inspection of the illustrations here given that the equipment of the valve with its packing is most easily performed, as is also the removal of the old packing and its replacement by a new one. The devices, moreover, are extremely simple, inexpensive of manufacture, and durable, and there is little or no liability of their becoming deranged or injured from extended use.

Having thus described my invention, what I claim, and desire to secure by Letters Patent, is—

1. In a valve of the character substantially as described, a disk-holder comprising members or segments separable or cleft on the axial plane of the holder, adapted to be matched together, having a socket or recess therein for the packing-disk, and detachable means for holding said separable members against spreading laterally, for the retention of the disk between them, substantially as described.

2. In a valve having the valve-seat and the valve-stem, of a disk-holder composed of members or segments separable on the plane of the axes of the holder, and adapted to embrace and hold a packing-disk, detachable means for holding said separable members against spreading from each other laterally, and means for connecting said separable members with the valve-stem.

3. In a valve, a disk-holder comprising the separable members $b$ $b$ having its lower portion enlarged and provided with the disk-socket $d$, one of said members being constructed for a dowel-and-socket engagement with the other, and said disk-holder as a whole having the externally-threaded upper part with the internal socket $i$, the valve-stem having the lower end flange $j$ and the coupling-nut $m$, arranged and combined substantially as and for the purposes set forth.

Signed by me at Elizabeth, New Jersey, this 17th day of January, 1900.

MICHAEL E. LYNCH.

Witnesses:
P. J. RYAN,
EDWARD A. RYAN.